May 13, 1958 R. E. FREDERICKS 2,834,213
DAMPING CONTROL
Filed May 29, 1956 3 Sheets-Sheet 1
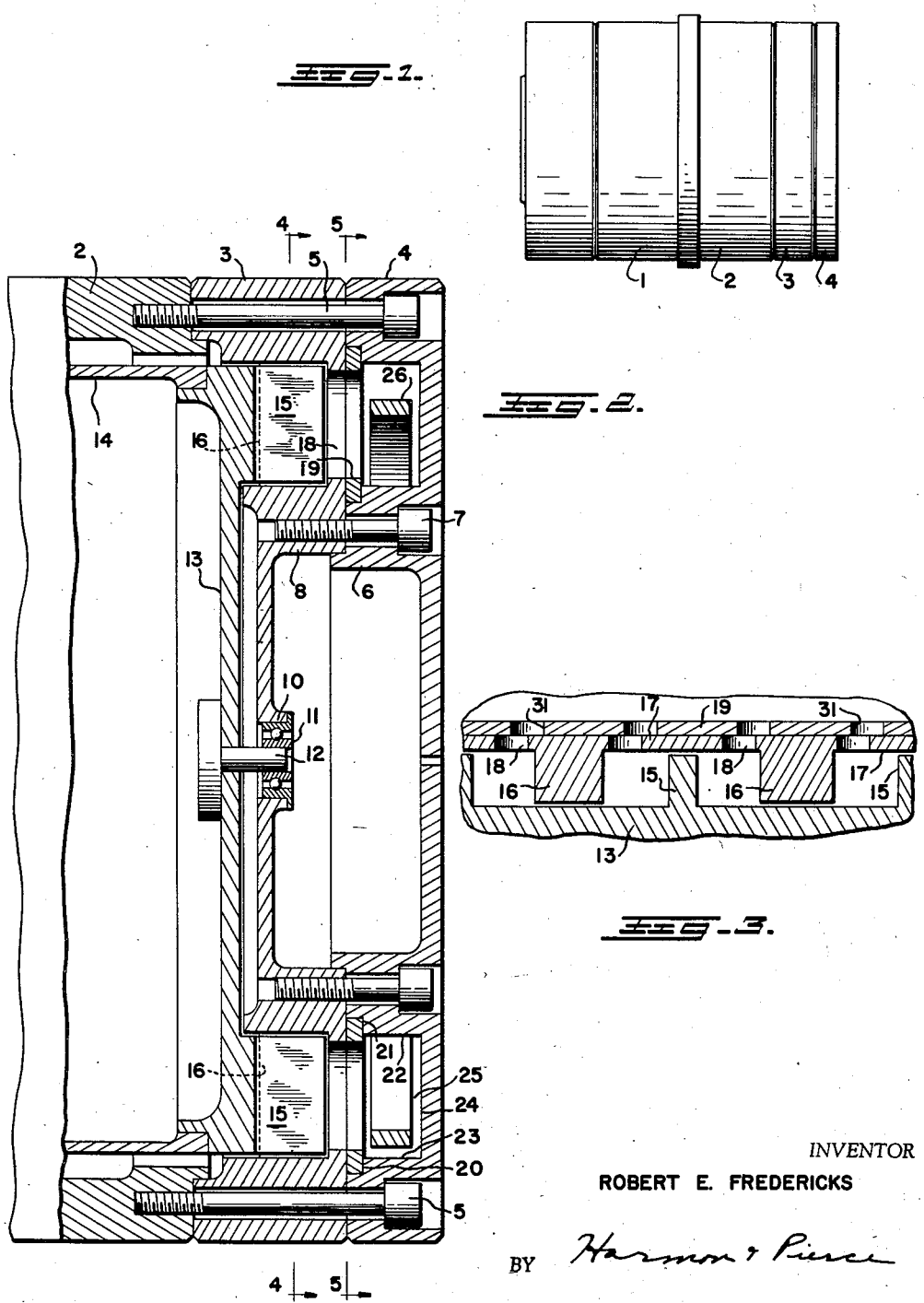
INVENTOR
ROBERT E. FREDERICKS
BY Harmon & Pierce
ATTORNEY May 13, 1958  R. E. FREDERICKS  2,834,213
DAMPING CONTROL
Filed May 29, 1956  3 Sheets-Sheet 2
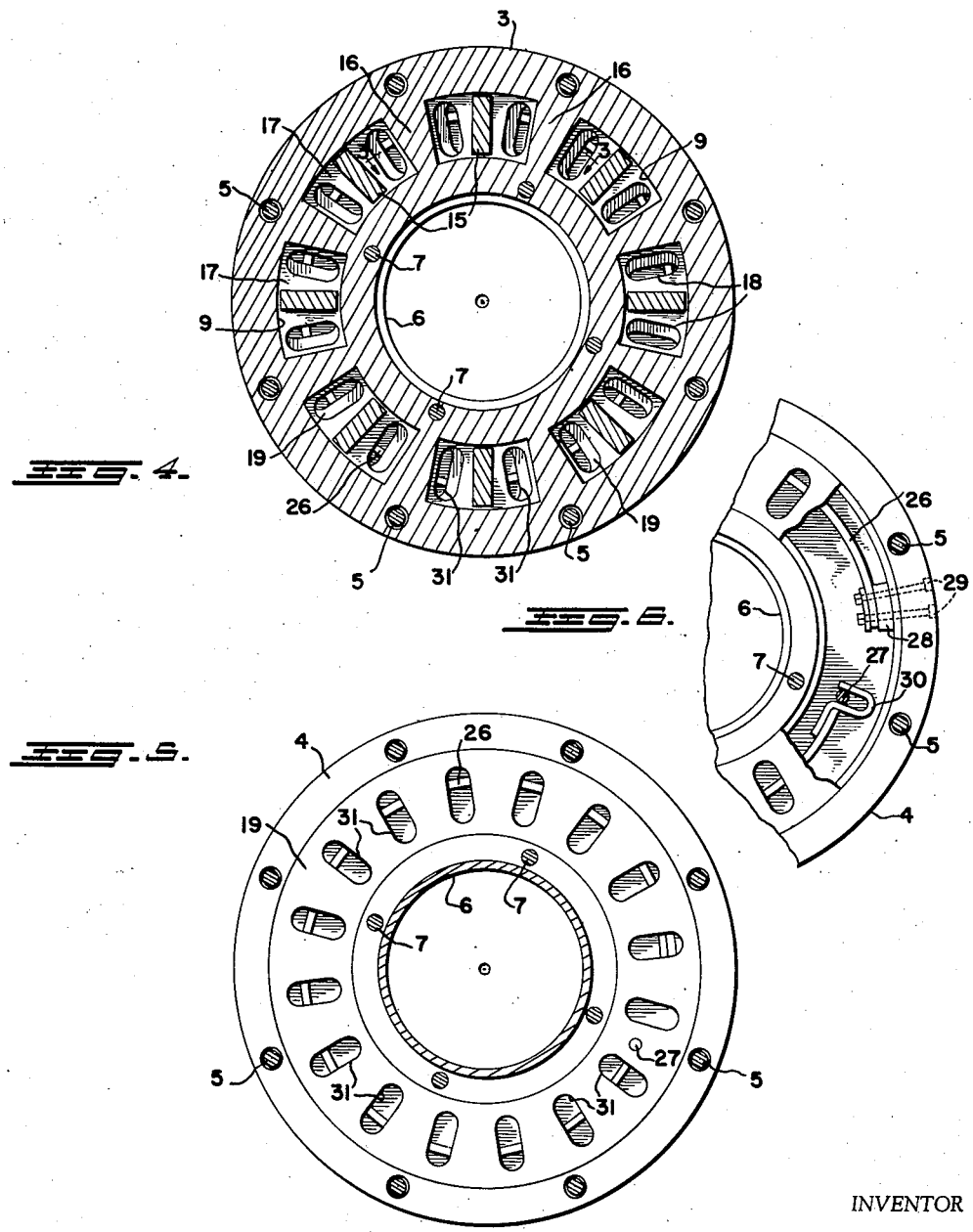
INVENTOR
ROBERT E. FREDERICKS
BY Harmon & Pierce
ATTORNEY May 13, 1958 R. E. FREDERICKS 2,834,213
DAMPING CONTROL
Filed May 29, 1956 3 Sheets-Sheet 3
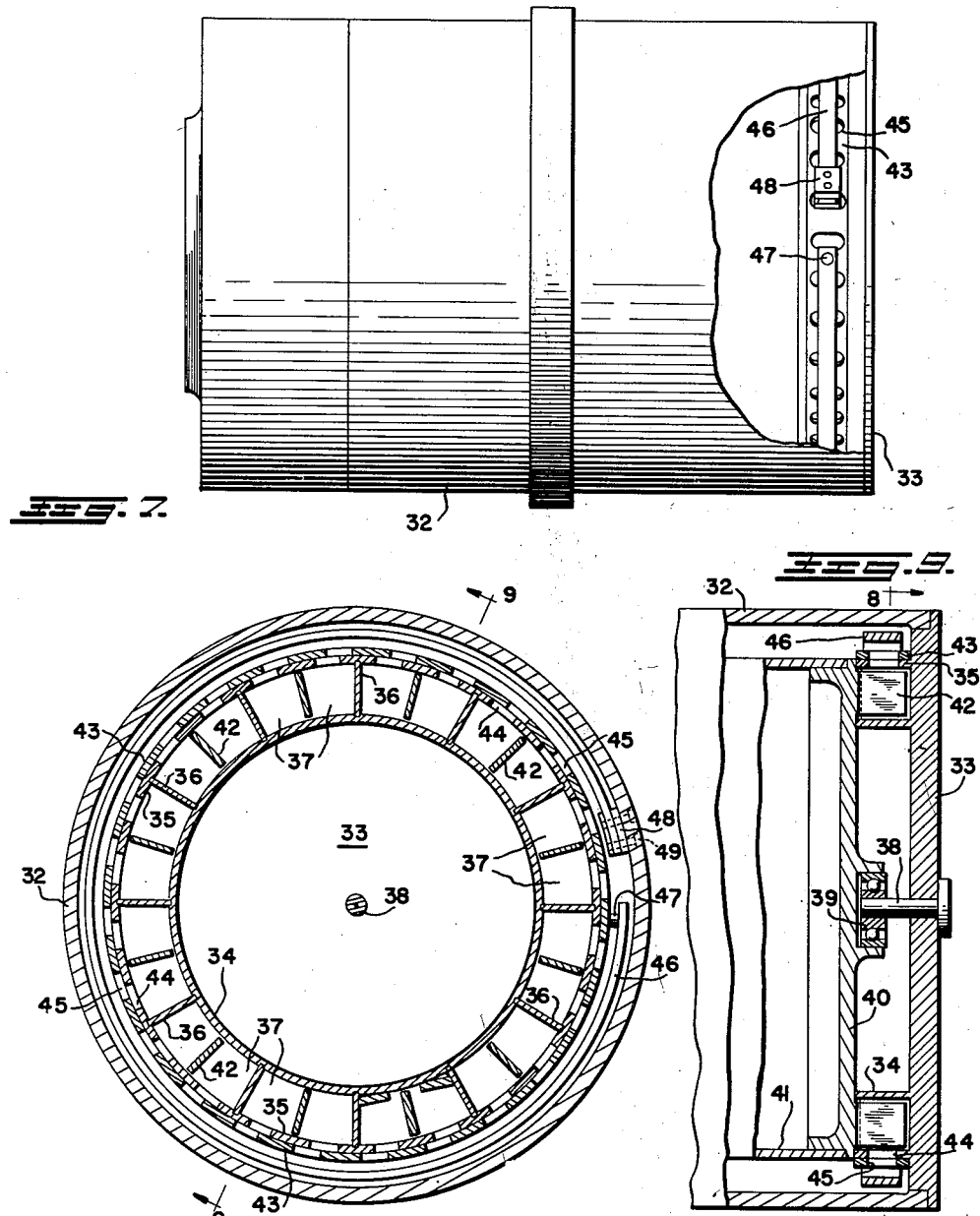
INVENTOR
ROBERT E. FREDERICKS
BY Harmon, Pierce
ATTORNEY

..

United States Patent Office 2,834,213
Patented May 13, 1958

2,834,213
DAMPING CONTROL

Robert E. Fredericks, Encino, Calif.

Application May 29, 1956, Serial No. 587,995

6 Claims. (Cl. 74—5.5)

This invention relates to damping controls for rotatable bodies and more particularly to fluid damping systems for such bodies where used for precision instrumentation or control.

This invention constitutes an improvement over United States Patent 2,718,149 issued to Bamford, Kees and Fredericks on September 20, 1955 from the standpoint of operation, production and cost.

The primary object of this invention is to provide an improved damping control for a rotatable body which is substantially constant in its effect on the body.

A more specific object of this invention is to provide an improved damping control for a rotatable body immersed in a fluid in which the effect of the control on the body is maintained substantially constant regardless of the effect of temperature changes on the viscosity of the fluid.

A further object of this invention is to provide a damping control for a rotatable body immersed in a fluid whereby the damping effect on the body is maintained constant in spite of varying temperatures, which affect the viscosity of the fluid, through the coaction of an orifice size changing structure and a thermal responsive element.

Another object of this invention is to provide a linear damping control for a rotatable body which is relatively simple to produce at a reasonable cost.

With the foregoing and other objects in view, the invention resides in the following specification and appended claims certain embodiments and details of construction of which are illustrated in the accompanying drawings in which:

Figure 1 is view in side elevation of an instrument such as a rate gyroscope for which this invention is particularly suitable.

Figure 2 is an enlarged, partial, sectioned view in side elevation of the instrument of Figure 1.

Figure 3 is a partial plan view in section of the damping control elements taken along the lines 3—3 on Figure 4.

Figure 4 is sectional view in end elevation taken along the lines 4—4 of Figure 2.

Figure 5 is a sectional view in end elevation taken along the lines 5—5 of Figure 2.

Figure 6 is a partial view in section similar to Figure 5 with a portion of the orifice control plate cutaway.

Figure 7 is a partially cutaway view in side elevation of an instrument utilizing a modified form of the invention.

Figure 8 is a sectional view in end elevation taken along the lines 8—8 of Figure 9.

Figure 9 is a sectional view in side elevation taken along the lines 9—9 of Figure 8.

Referring now more particularly to the preferred embodiment of the invention as illustrated in Figures 1 to 6 inclusive, a sealed unit 1 is disclosed as having casing portions 2, 3 and 4 secured together by bolts 5. Casing portion 4 constitutes the end cap for the instrument unit 1. Inwardly directed of the cap 4 is an integral circular boss 6. Secured to boss 6 by bolts 7 is a bearing ring 8 which is integral with casing portion 3 and with which it forms vane chambers 9. (Figure 4).

Centrally disposed in the bearing ring is an aperture 10 within which is carried an anti friction bearing 11. Supported for free rotatary movement by bearing 11 is a stud 12. Stud 12 is secured by any suitable means to the rear casing cover 13 of a body 14 mounted within unit 1 by means of bearing 11 and another opposite end bearing (not shown) for free relative rotary movement thereto.

Integral with and extending longitudinally rearwardly of the cover 13 of body 14 is a plurality of vanes 15. The vanes 15 extend into the chambers 9 formed in casing portion 3 and illustrated in Figure 3. The inwardly extending struts 16 of casing portion 3, which actually divide the space between the bearing ring 8 and the inner wall of the outer section of casing portion 3 into individual chambers, extend inwardly to a point closely adjacent the cover 13 of body 14. Likewise, the vanes 15 extend longitudinally of the cover 13 to points closely adjacent the bridging sections 17 of casing portions 3. Each section 17 is provided with a pair of orifices or ports 18.

Positioned immediately adjacent the bridging sections 17 is an orifice control plate 19. The plate 19 is rotatably carried by cap 4 of unit 1. The cap 4 is recessed at 20 and 21 to provide, in effect, a bearing surface for plate 19. Defined by the outer peripheral wall 22 of circular boss 6, the inner wall surface 23 of cap 4 and inner surface 24 of cap 4 is an annular chamber 25. Positioned within chamber 25 is a substantially annular thermostatic spring 26 which is secured at one end to cap 4 through a mounting block 28 and screws 29. As illustrated in Figure 6, the movable end of thermally responsive spring 26 positions plate 19 through stud 27 by means of open clip 30 which provides a slip fit to accommodate the radial component of angular motion of spring 26, but it is obvious that other suitable securing means could be utilized.

The operation of the invention should be readily apparent to one skilled in the art. Depending on the type of thermal spring 26 utilized and the type of damping fluid used and other machine tolerance factors, a certain pre-selected damping effect will be maintained by the movement of vanes 15 in the fluid, which completely fills the space between the body 14 and the casing of the unit 1 including the chambers 9. The control plate 19 is provided with orifices 31 equal in number to the orifices 18 and being illustrated as having the same port areas as orifices 18. It is obvious that other port designs may be utilized. As illustrated in Figures 3 and 4, the orifices 31 and 18 are overlapping each other, thereby increasing the resistance to flow of the damping fluid to and from the chambers 9. Under relatively higher temperatures from normal, the viscosity of the damping fluid will decrease. To compensate for this change, the thermal responsive spring 26 will act to rotate plate 19 to further restrict the passage of fluid through orifices 18 and 31. Consequently, the damping fluid in the chambers 9 will continue to have the same constant effect on vanes 15 of the rotatable body 14. Conversely, as the temperature surrounding unit 1 decreases below normal, the viscosity of the damping fluid will increase requiring the spring 26 to move plate 19 so as to move orifices 18 and 31 towards coincidence to thereby lessen the resistance to flow of fluid to and from chambers 9. A normal temperature setting would place the plate 19 in approximately the position illustrated in Figure 3 when the orifices 18 and 31 are approximately fifty percent out of line so that there may be a substantially equal range of movement in either direction.

Referring now to the modified form illustrated in Figures 7, 8 and 9, there is shown a damping system which is similar to the preferred form of Figures 1 to 6 inclusive, except that it may be defined as "radial" damping as contrasted to the "longitudinal" damping utilized in the preferred form. Here the unit casing 32 is illustrated having an end cap 33. The cap 33 is provided with an integral inwardly extending ring 34 and a larger integral inwardly extending ring 35 concentric with ring 34. The inner and outer rings 34 and 35 have connected struts 36 dividing the space between the rings into a plurality of equal size chambers 37.

Connected to cap 33, located centrally thereof, and extending inwardly thereof, is a bearing stud 38. The inward end of stud 38 is received in a bearing 39 carried by the end cap 40 of a rotatable body 41. A like bearing (not shown) supports the opposite end of the body 41. Extending longitudinally of the cap 40 is a plurality of vanes 42. These vanes 42 extend into chambers 37 and the ends of said vanes are positioned in close proximity to the inner wall surface of casing cap 33. Supported concentrically, for free relative sliding movement on the outer ring 35, is a control ring 43. The ring 35 and the control ring 43 are provided with an equal number of orifices 44 and 45 respectively, there being two of each of such orifices to each chamber 37. Positioned in the space between control ring 43 and the casing 32 is a thermal responsive spring 46. The movable end of spring 46 positions control ring 43 through stud 47 by any suitable means, such as a slip-fit slot in spring 46. The other end of spring 46 is secured to casing 32 by means of a mounting block 48 and screws 49.

Except for the fact that fluid flow to and from chambers 37 will be in a radial direction, the operation and control in this form of the invention is identical with that of the preferred form where the fluid flow was longitudinal of the unit 1 from chambers 9. In this form, when the body 41 rotates relative to casing 32, the vanes 42 will move in chambers 37 against the resistance of the damping fluid, expelling fluid through one set of orifices 44 and 45 and drawing fluid into the chambers behind the vanes through like orifices. Under varying temperature conditions, the thermal responsive spring will act to shift the position of control ring 43 relative to ring 35 to varying the restriction to fluid flow through the orifices of those rings.

It is thus seen that this invention provides for damping a rotatable body immersed in a fluid so that the damping effect will remain constant under varying temperature conditions. Although the damping effect would not be forseeably as effective, it is realized that the instrument would operate if a purely air system were used, it being necessary only to more greatly restrict the size of the orifices involved. However, the damping effect if air were used instead of liquid such as silicone as preferred here, it is extremely doubtful if a true constant damping effect could be maintained.

The invention resides in the basic elements of the damping control and their coaction in obtaining an effective damping control of a rotatable body and not necessarily in their exact mode of construction and placement. It is readily forseen that the exact structure as shown and described is adaptable to structural modifications.

I claim:

1. A damping control for a rotatable body comprising a casing for carrying the body and being filled with fluid about the body, a plurality of walled chambers formed by and positioned interiorly of said casing, a plurality of vanes secured to said rotatable body, one each of said vanes extending into each of said chambers with the peripheral edge of each vane being in spaced relationship to the walls of said chambers, said chambers each being provided with a pair of orifices, control means associated with said chamber orifices to vary the passage of fluid to and from said chambers and thermal responsive means to actuate said control means.

2. A damping control for a rotatable body comprising a casing for carrying the body for free rotation therein and being filled with fluid about the body, coacting means on said body and said casing to provide damping for the body of a constant magnitude, said coacting means including fluid flow orifices, a control means with orifices carried by the casing so that the orifices of the control means and of the coacting means are in substantial alignment, and thermal responsive means connected to said casing and said control means to vary the alignment between the two sets of orifices to vary the passage size afforded to the damping fluid.

3. A damping control for a rate gyroscope comprising a casing, a gimbal mounted for free rotation within the casing, said casing being filled with fluid about said gimbal, coacting means on said gimbal and said casing to provide damping for the gimbal of a constant magnitude, said coacting means including variable fluid flow passages, and means connected with said casing and said coacting means to inversely vary the size of said fluid passages in response to temperature changes.

4. A damping control for a rate gyroscope comprising a casing, a gimbal mounted for free rotation within the casing, said casing being filled with fluid about said gimbal, comprising a plurality of chambers formed by and positioned interiorly of said casing, a plurality of vanes integral with said gimbal, one each of said vanes extending into each of said chambers, said chambers each being provided with a pair of orifices, control means associated with said chamber orifices to vary the passage of fluid to and from said chambers, and thermal responsive means to actuate said control means.

5. A damping control for a rotatable body comprising a casing for carrying the body for free rotation therein and being filled with fluid about the body, a plurality of chambers formed by and positioned interiorly of said casing at one end thereof, said chambers each being provided with a pair of orifices, all of said orifices lying in a plane at right angles to the mounting axis of the rotatable body, a plurality of vanes integral with said rotatable body, one each of said vanes extending into each of said chambers for limited movement therein, a control plate carried within said casing for free relative movement thereto and being positioned immediately adjacent said chambers and the orifices thereof, said control plate having orifices which coact with the chamber orifices to vary the resistance to fluid flow to and from the chambers, and a thermal responsive means interconnected between the casing and the plate to automatically actuate said control plate under varying temperature conditions.

6. A damping control for a rotatable body comprising a casing for carrying the body for free rotation therein and being filled with fluid about said body, a plurality of chambers formed by and positioned interiorly of said casing at one end thereof, said chambers each being provided with a pair of orifices all of said orifices opening radially from the chambers to the casing generally relative to the mounting axis of the rotatable body, a plurality of vanes integral with said rotatable body, one each of said vanes extending into each of said chambers for limited movement therein, a control ring carried within said casing in close fitting concentric relationship with said chambers, said control ring being freely movable about said chambers and having orifices which coact with the chamber orifices to vary the resistance to fluid flow to and from the chambers, and a thermal responsive means interconnected between the casing and the ring to automatically actuate said ring under varying temperature conditions.

References Cited in the file of this patent

UNITED STATES PATENTS

| | | |
|---|---|---|
| 1,486,381 | Jaenichen | Mar. 11, 1924 |
| 1,884,188 | Peo | Oct. 25, 1932 |
| 2,046,723 | Brownscombe | July 7, 1936 |
| 2,091,830 | Peteler | Aug. 31, 1937 |
| 2,209,960 | Dashefsky | Aug. 6, 1940 |
| 2,718,149 | Bamford et al. | Sept. 20, 1955 |